United States Patent
Malladi et al.

(10) Patent No.: US 9,113,412 B2
(45) Date of Patent: Aug. 18, 2015

(54) LOW POWER NODE DORMANT STATE

(71) Applicant: QUALCOMM Incorporated, San Diego, CA (US)

(72) Inventors: Durga Prasad Malladi, San Diego, CA (US); Aleksandar Damnjanovic, Del Mar, CA (US); Gavin Bernard Horn, La Jolla, CA (US); Yongbin Wei, San Diego, CA (US); Rajat Prakash, La Jolla, CA (US); Miguel Griot, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 48 days.

(21) Appl. No.: 13/711,507

(22) Filed: Dec. 11, 2012

(65) Prior Publication Data

US 2013/0148558 A1    Jun. 13, 2013

Related U.S. Application Data

(60) Provisional application No. 61/569,729, filed on Dec. 12, 2011.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 52/02* | (2009.01) |
| *H04B 7/14* | (2006.01) |
| *H04B 7/26* | (2006.01) |
| *H04W 88/04* | (2009.01) |

(52) U.S. Cl.
CPC ............. *H04W 52/0219* (2013.01); *H04B 7/14* (2013.01); *H04B 7/26* (2013.01); *H04W 52/0206* (2013.01); *H04W 52/0225* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 7,472,027 B1* | 12/2008 | Batcher et al. | 702/60 |
| 2010/0087197 A1* | 4/2010 | Iwamura et al. | 455/436 |
| 2010/0087208 A1* | 4/2010 | Lister | 455/456.5 |

(Continued)

FOREIGN PATENT DOCUMENTS

| | | |
|---|---|---|
| EP | 2536221 A1 | 12/2012 |
| GB | 2479904 A * | 11/2011 |

(Continued)

OTHER PUBLICATIONS

Author Unknown, RRC Connect, pp. 1-6, as stored by the Internet Archive, www.archive.org, on Aug. 12, 2011.*

(Continued)

*Primary Examiner* — Christopher Crutchfield
(74) *Attorney, Agent, or Firm* — Seyfarth Shaw LLP

(57) ABSTRACT

The state of an access link and backhaul link of a low power node may be determined and controlled after a low power node is initialized. The overhead signaling on the access link of a relay is controlled based on detecting a user equipment (UE). The connection on the backhaul link of the relay is managed in response to the overhead signaling on the access link.

15 Claims, 12 Drawing Sheets

(56) References Cited

U.S. PATENT DOCUMENTS

| | | |
|---|---|---|
| 2010/0240379 A1* | 9/2010 | Kishiyama et al. ............ 455/450 |
| 2011/0242970 A1 | 10/2011 | Prakash et al. |
| 2011/0256826 A1 | 10/2011 | Ode et al. |
| 2011/0306334 A1 | 12/2011 | Brunel et al. |
| 2012/0044836 A1 | 2/2012 | Sivavakeesar et al. |
| 2012/0052796 A1* | 3/2012 | Takano ............................ 455/7 |
| 2012/0115467 A1 | 5/2012 | Conte et al. |
| 2012/0122444 A1* | 5/2012 | Yoon et al. ................. 455/422.1 |
| 2012/0184284 A1 | 7/2012 | Moisio et al. |
| 2013/0028161 A1 | 1/2013 | Maeda et al. |
| 2013/0064173 A1* | 3/2013 | Sivavakeesar et al. ........ 370/315 |

FOREIGN PATENT DOCUMENTS

| | | |
|---|---|---|
| WO | 2010151186 A1 | 12/2010 |
| WO | 2011099513 A1 | 8/2011 |
| WO | 2011135825 A1 | 11/2011 |

OTHER PUBLICATIONS

International Search Report and Written Opinion—PCT/US2012/069285—ISA/EPO—Mar. 26, 2013.

Taiwan Search Report—TW101146936—TIPO—Oct. 16, 2014.

\* cited by examiner

LOW POWER NODE DORMANT STATE

CROSS-REFERENCE TO RELATED APPLICATION

This application claims the benefit under 35 U.S.C. §119 (e) to U.S. Provisional Patent Application No. 61/569,729 entitled "RELAY STATION DORMANT STATE," filed on Dec. 12, 2011, the disclosure of which is expressly incorporated by reference herein in its entirety.

BACKGROUND

1. Field

Aspects of the present disclosure relate generally to wireless communication systems, and more particularly to controlling low power node activity states.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

In one aspect, a method of wireless communication is disclosed. The method includes controlling overhead signaling on an access link of a low power node based on detecting a user equipment (UE). A connection on a backhaul link of the low power node is managed in response to the overhead signaling on the access link.

Another aspect discloses wireless communication having a memory and at least one processor coupled to the memory. The processor(s) is configured to control overhead signaling on an access link of a low power node based on detecting a user equipment (UE). The processor(s) is also configured to manage a connection on a backhaul link of the low power node in response to the overhead signaling on the access link.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of controlling overhead signaling on an access link of a low power node based on detecting a user equipment (UE). The program code also causes the processor(s) to manage a connection on a backhaul link of the low power node in response to the overhead signaling on the access link.

Another aspect discloses an apparatus including means for controlling overhead signaling on an access link of a low power node based on detecting a user equipment (UE). Also included is a means for managing a connection on a backhaul link of the low power node in response to the overhead signaling on the access link.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
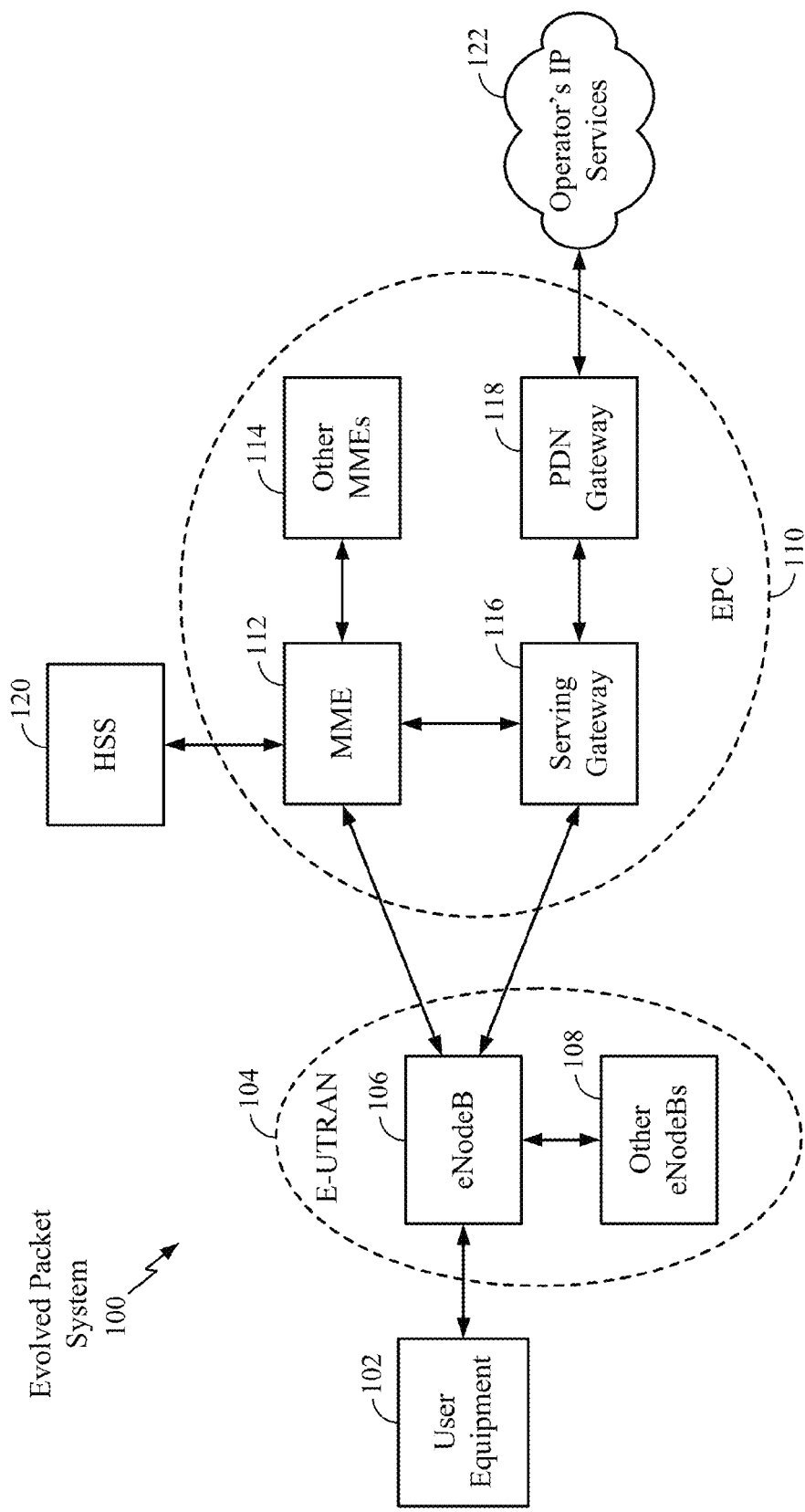
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
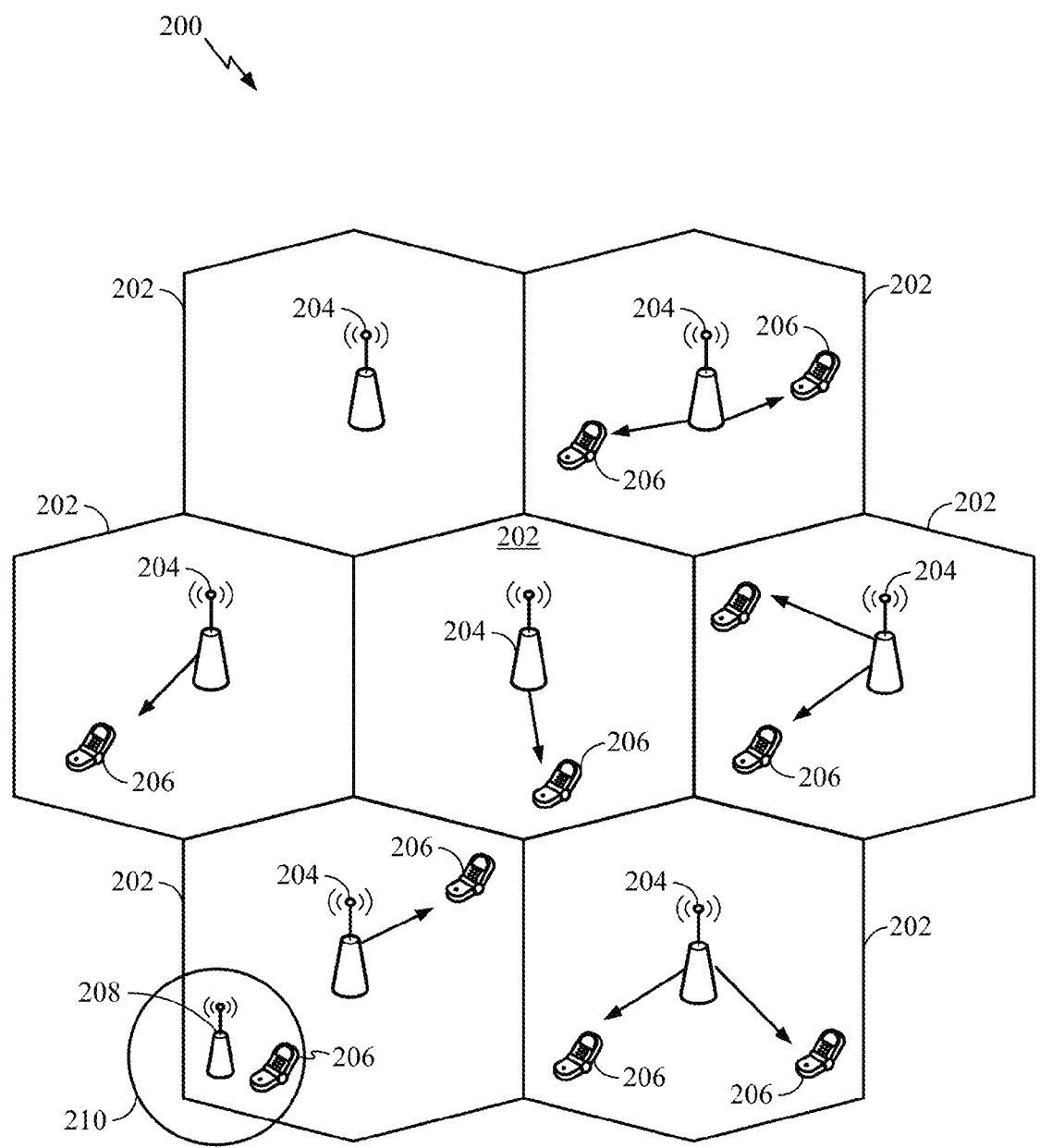
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. The lower power class eNodeB 208 may be a remote radio head (RRH), a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
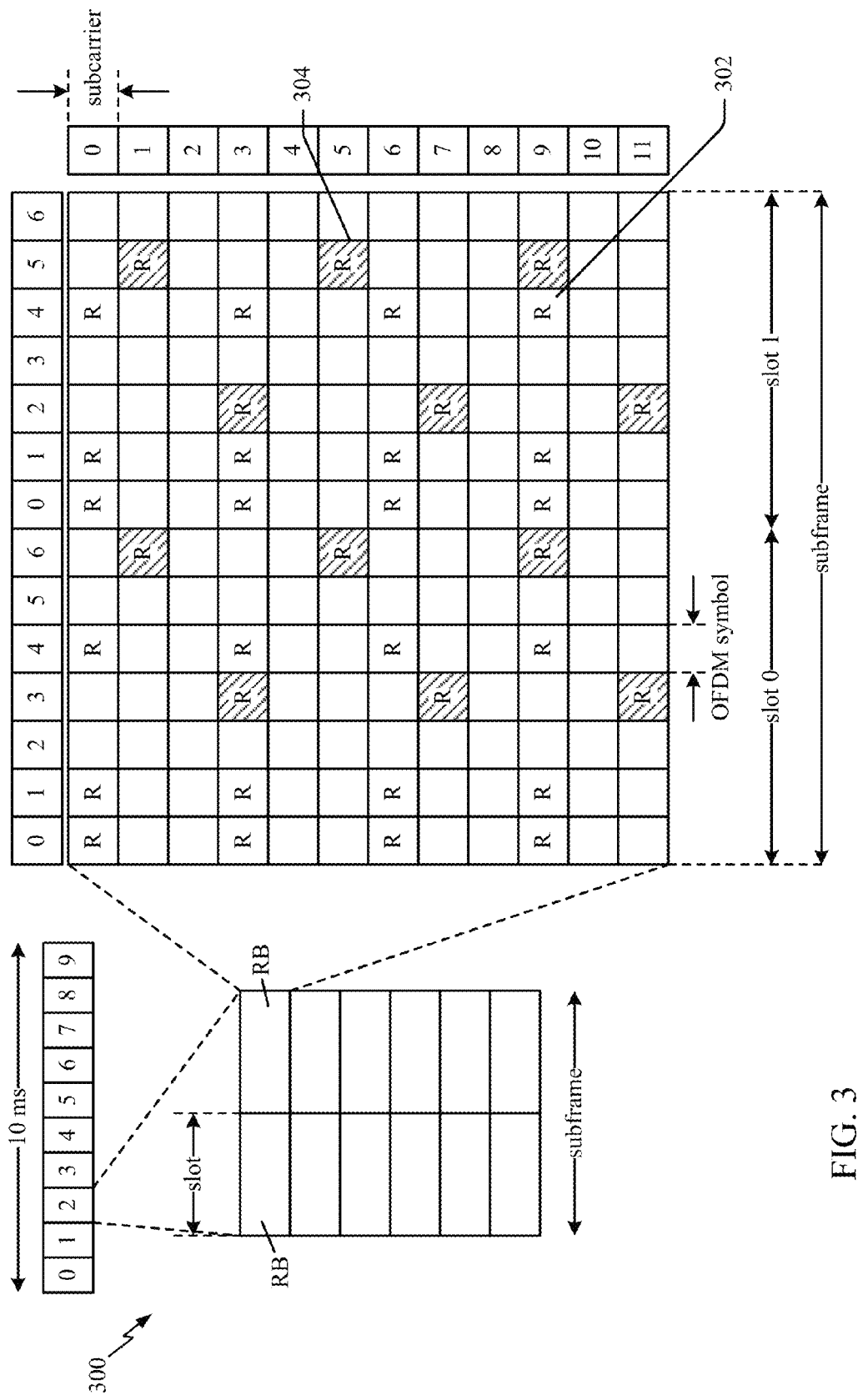
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
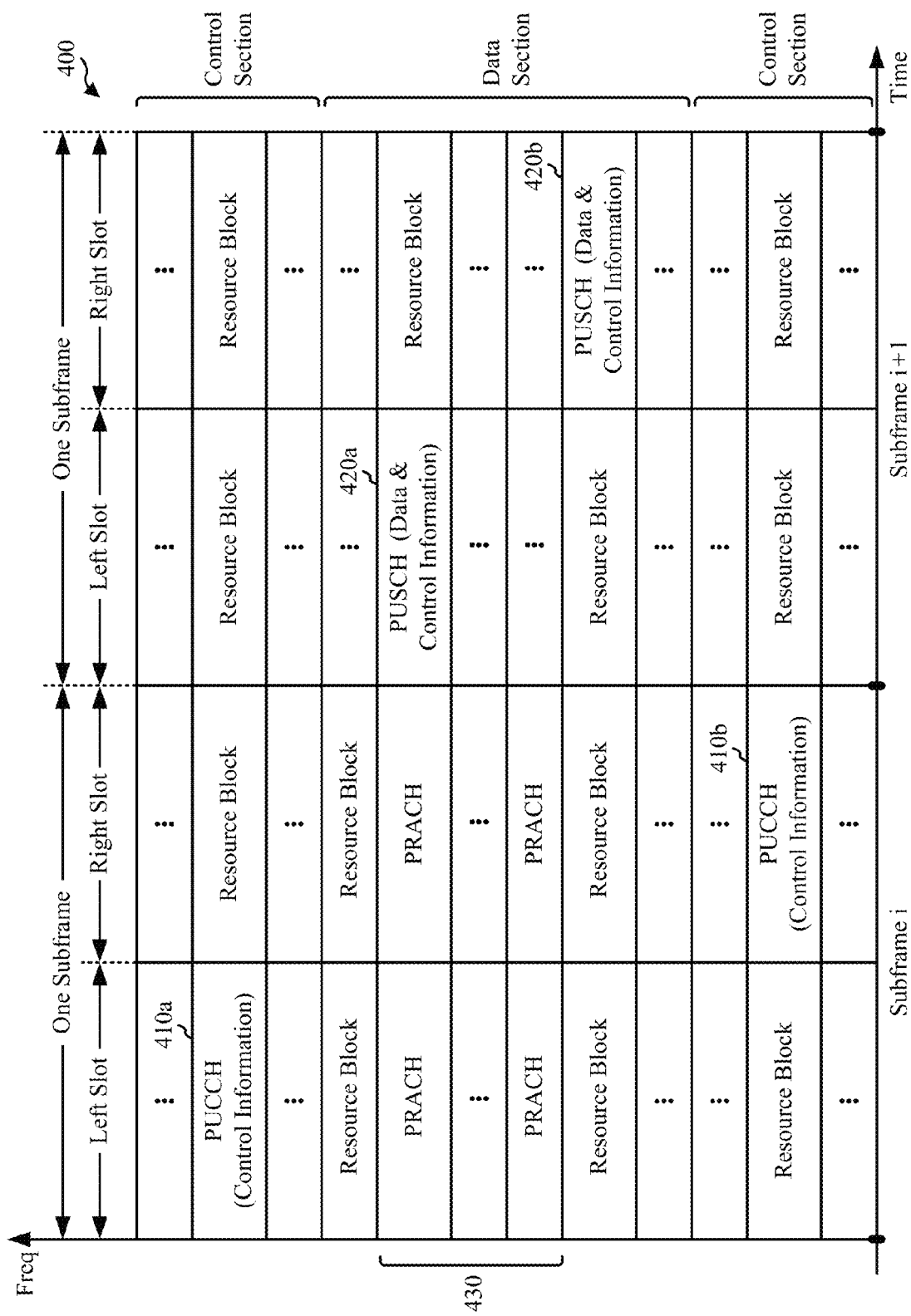
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random access sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
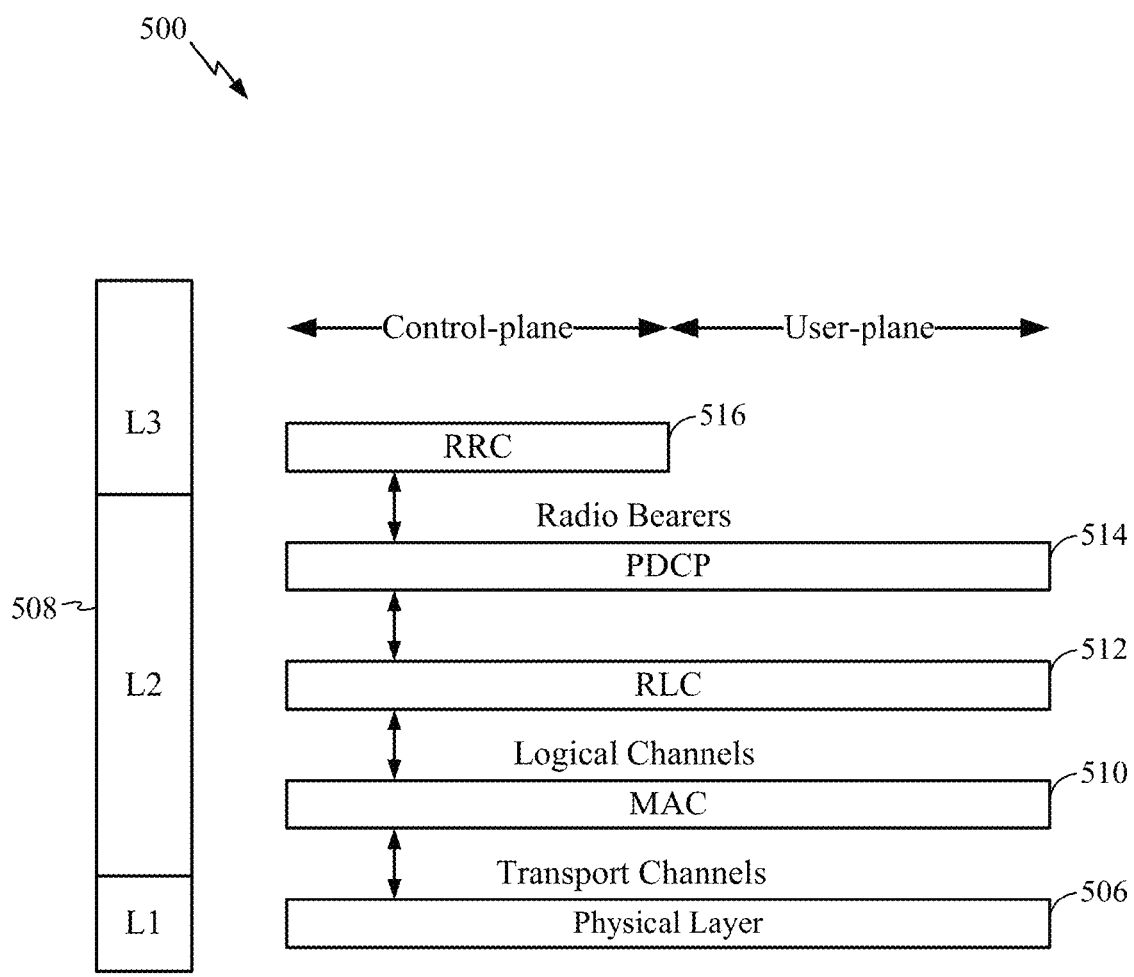
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
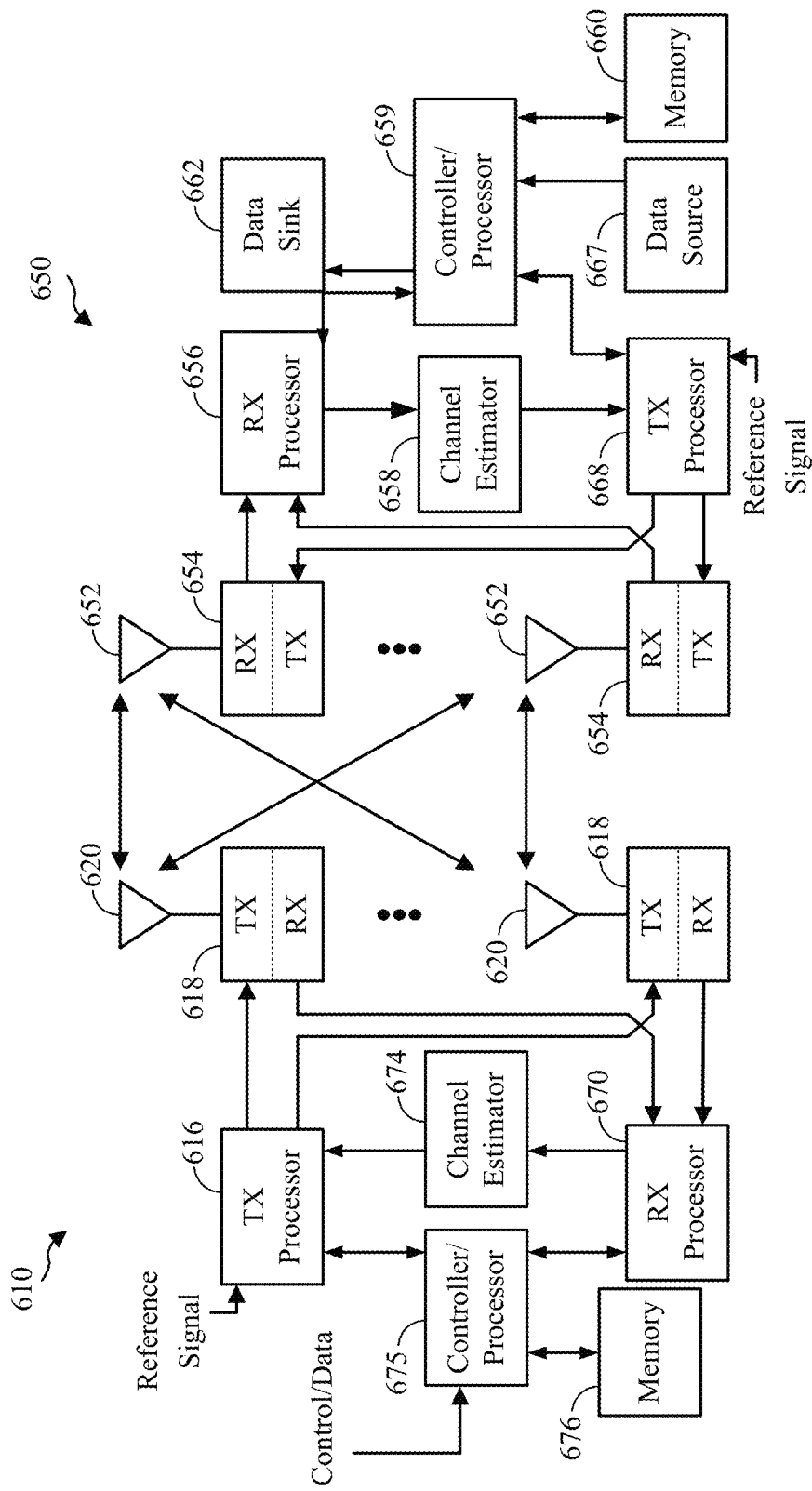
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Low Power Node Dormant State

Figure 7:
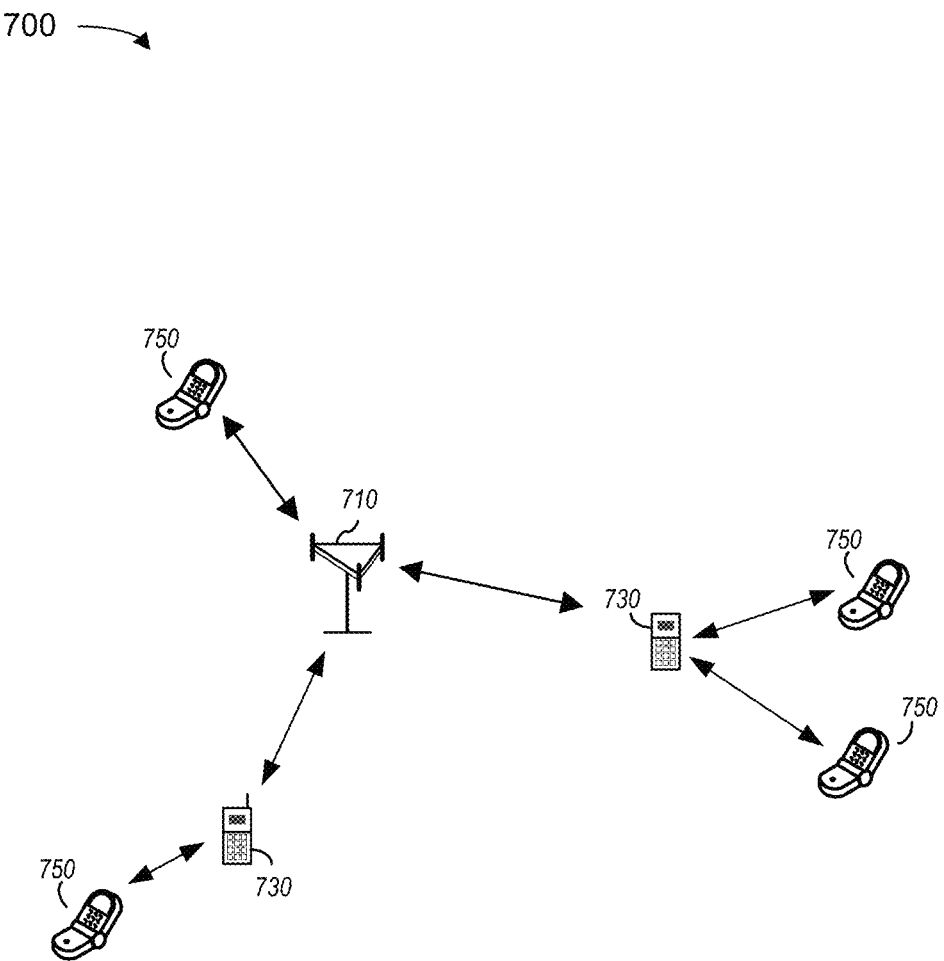
FIG. 7 is a diagram illustrating an example system including a low power node.

FIG. 7 shows an exemplary network structure 700 that supports low power node operation. The network 700 includes eNodeB 710, UEs 750, and low power nodes 730. The low power nodes 730 may be UE relays which are low power nodes with both UE and eNodeB functionality, and may be dispersed throughout a network to facilitate communication between UEs and eNodeBs. The low power node may be referred to as a relay station with wireless backhaul, a UE relay station, relay eNB, UE relay acting as eNB (UeNB), or a small cell with wired backhaul. In a system utilizing lower power nodes, such as UE relays, the eNodeB 710 may also be referred to as a donor base station or donor eNodeB (DeNB).

Typically, a low power node 730 receives a transmission of data and/or other information from an upstream station (e.g., an eNodeB or a UE) and sends a transmission of the data and/or other information to a downstream station (e.g., a UE or an eNodeB). A low power node may be a station that is dedicated to relaying transmissions for UEs. A low power node may also be a UE that relays transmissions for other UEs. The low power node may communicate with a UE via an access link and may communicate with an eNodeB via a backhaul link in order to facilitate communication between the UE and the eNodeB.

Low power nodes may be utilized in a network to enhance network capacity. In particular, low power node deployment in a network may improve the signal-to-noise-plus-interference ratio (SNIR) on the backhaul link and reduce interference on the access link.

According to an aspect of the present disclosure, a low power node may be configured to have an active state and a dormant state. The active state and dormant state refer to states of an access link and backhaul link of the low power node. In some cases, a low power node may be battery powered, and therefore, it is desirable to reduce the energy consumption of the low power node. It may also be desirable to reduce the energy consumption of non-battery powered low power nodes. Aspects of the present disclosure provide a dormant state for reducing the power consumption of the low power node.

Figure 8:
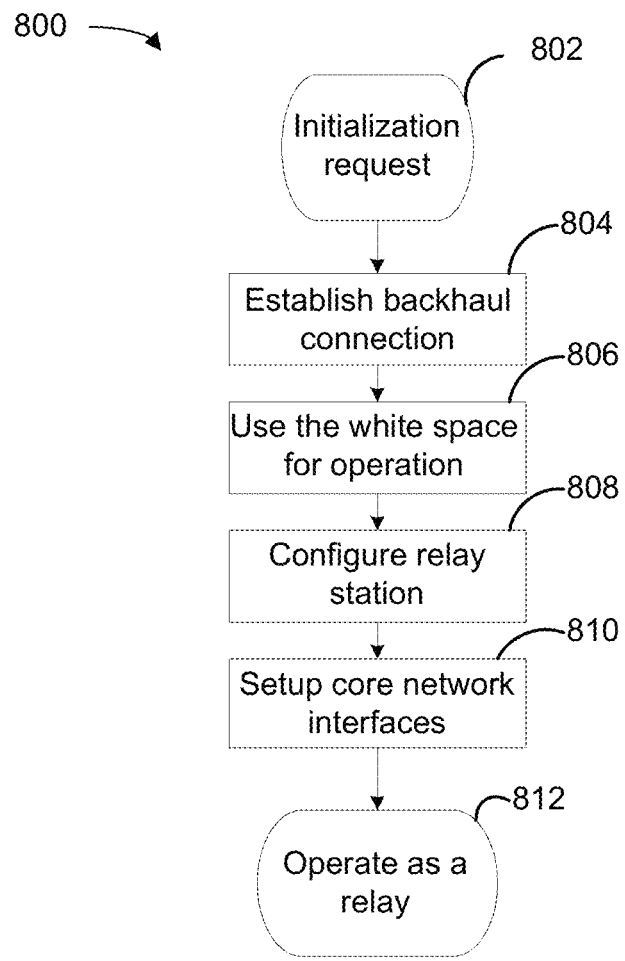
FIG. 8 is a block diagram illustrating a method for initializing a low power node according to an aspect of the present disclosure.

In one configuration, the low power node 730 completes an initialization process prior to entering a dormant state. FIG. 8 illustrates an initialization process 800 according to an aspect of the present disclosure. In one configuration, the process begins with an initialization request at block 802. After the initialization request (block 802), at block 804, a backhaul connection is established between the low power node and the eNodeB. The eNodeB may be referred to as the base station or a donor eNodeB (DeNB). In one configuration, at block 804, the low power node may also determine if the backhaul link is suitable for use, obtain an IP address, and complete the connection. The low power node may determine that the backhaul link is suitable for use if the bandwidth is equal to or greater than a threshold value.

After the backhaul connection is established, the eNodeB may use the white space for operation, at block 806. In one configuration, the backhaul connection may not use the white space and may use a licensed spectrum, in which case, block 806 can be omitted. In another configuration, the eNodeB may be use the white space for operation after blocks 808 and 810. At block 808, the low power node is configured via operation administration and maintenance procedures. After the low power node is configured, core network interfaces are setup, at block 810. For example, S1 and S8 interfaces are set up, allowing communication with a mobility management entity (MME) and serving gateway, respectively. Finally, at block 812, the low power node may operate as a relay.

According to an aspect of the present disclosure, the state of the access link and backhaul link of the low power node may be determined and controlled after the low power node is initialized. The backhaul or access links be in a dormant state or an active state. The backhaul link refers to the link between the low power node and an eNodeB. An access link refers to the link between the low power node and a UE. In one aspect of the present disclosure, the access links and backhaul links may be configured with various states to conserve battery power.

In one aspect of the present disclosure, the access link and backhaul link may be configured to include a global dormant state. Both the backhaul link and the access link are dormant during the global dormant state. Furthermore, the access link and backhaul link may be configured to include a low power node preparation state for activating the low power node. In the low power node preparation state, the backhaul link is active and the access link is dormant. Moreover, the access link and backhaul link may be configured to include a global active state. In the global active state, both the backhaul link and the access link are active. Finally, the access links and backhaul links may also be configured to include a tether-free ("peer-to-peer") state, in which the backhaul link is dormant and the access link is active.

Figure 9:
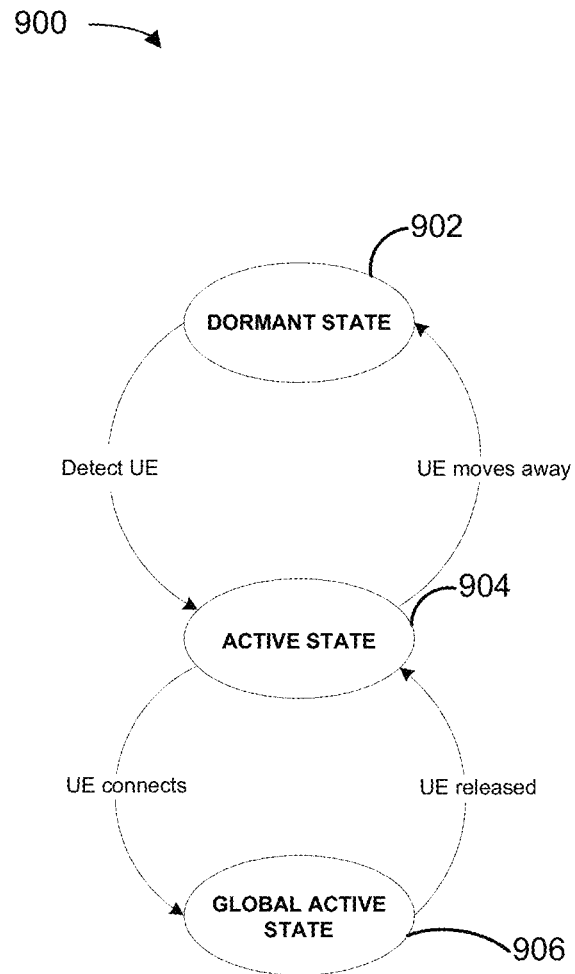
FIG. 9 is a block diagram illustrating low power node state transitions according to an aspect of the present disclosure.

FIG. 9 illustrates transitions between the various states 900 for the access link and backhaul links of a low power node according to an aspect of the present disclosure. In a dormant state 902, the access link is dormant and the backhaul link may be dormant or active. While in the dormant state 902, the low power node signals at a reduced duty cycle. In one example, the duty cycle may be ON for 40 ms of every 1000 ms. The low power node may advertise its presence during the reduced duty cycle to provide opportunities for the UE to access the low power node. In one configuration, while in the dormant state 902, the low power node advertises its presence by transmitting overhead signaling, such as PSS/SSS, PBCH, CRS, System Information Block 1 (SIB1), and System Information Block 2 (SIB2) signals, at a reduced duty cycle. A relay in the dormant state 902 may be referred to as a dormant low power node.

A UE may detect the dormant low power node as a result of the advertisement if the UE is within a specific range of the dormant low power node. The UE may access the dormant low power node on physical random access channels (PRACHs) at a low duty cycle. Moreover, the UE may access the low power node at a period that is delayed from the advertisement of the presence of the low power node. The delay accounts for the time for the UE to detect a low power node, decode SIB messages, and perform the RACH procedure.

The transition of an access link from a dormant state to active state may be triggered by various events. In some cases, the low power node transitions from the dormant state 902 to an active state 904 when a UE is detected. During the active state 904, the access link is active and the backhaul link may be active or dormant. In one configuration, the low power node may also determine whether other low power nodes are available to serve the UE. That is, the low power node may not transition to the active state 904 when other low power nodes are available to serve the UE. More specifically, the low power node may transition to an active state 904 when a UE is detected and other low power nodes are not available to serve the UE. The triggering event may also include receiving a random access message, such as a preamble transmitted on a random access channel, a user data message sent on an uplink shared channel (Msg1), or a signaling message transmitted on an uplink shared channel (Msg3). Other triggering events may further include detecting a sounding reference signal or a signature sequence from a UE. The eNodeB may signal a set of signature sequences that may be used by the UEs and low power nodes.

During an active state 904, the low power node may transmit acquisition signals and channels, reference signals, and system broadcasts with a nominal duty cycle. In one configuration, the duty cycle may be reduced. However, the duty cycle of the active state 904 is more frequent than the duty cycle of the dormant state 902.

As previously discussed, in the active state 904, the backhaul link may have a dormant or active state. During the dormant state of the backhaul link, a reduced or low duty cycle may specified for the low power node to listen for overhead information from the eNodeB. The overhead information may advertise the presence of the eNodeB. As stated above, the eNodeB may also be referred to as a donor eNB. The dormant state of backhaul link may also specify a reduced or lower duty cycle for the low power node to access the eNodeB.

The eNodeB transmits signals, including overhead signals, such as PSS/SSS, PBCH, reference signal, SIB1, and SIB2 messages. The low power node with a dormant state on the backhaul link may detect the eNodeB signals at a lower duty cycle and thus performs low duty cycle tracking of network timing and frequency. Less frequent opportunities are provided to the low power node by the eNodeB for access on the PRACH. In one configuration, when the low power node is in a dormant state on the backhaul link, the eNodeB instructs the low power node to monitor signals on the backhaul link at the reduced duty cycle.

In one configuration, the activity and behavior of the access link may determine whether the backhaul link is in an active or dormant state. That is, a low power node transitions to the active state on the backhaul when a triggering event occurs from the access link. In some cases, a triggering event may include a UE requesting to transmit data to the network via the backhaul link. For example, the low power node may transition to an active state on the backhaul link when a UE requests to transmit data to the eNodeB (DeNB) via the backhaul link. The backhaul link transitions to the active state in the global active state 906 by accessing the eNodeB (DeNB) and establishing signaling and data radio bearers.

Once in the active state the access link or backhaul link may return to the dormant state. A transition to the dormant state for either the backhaul link or access link may occur when there is no activity on the link or an active state triggering UE is released or moves out of range. For example, in FIG. 9, the low power node may transition from the global active state 906 to active state 904 when the last UE is released. The low power node further transitions from the active state 904 to the dormant state 902 when the last UE moves out of coverage.

Figure 10:
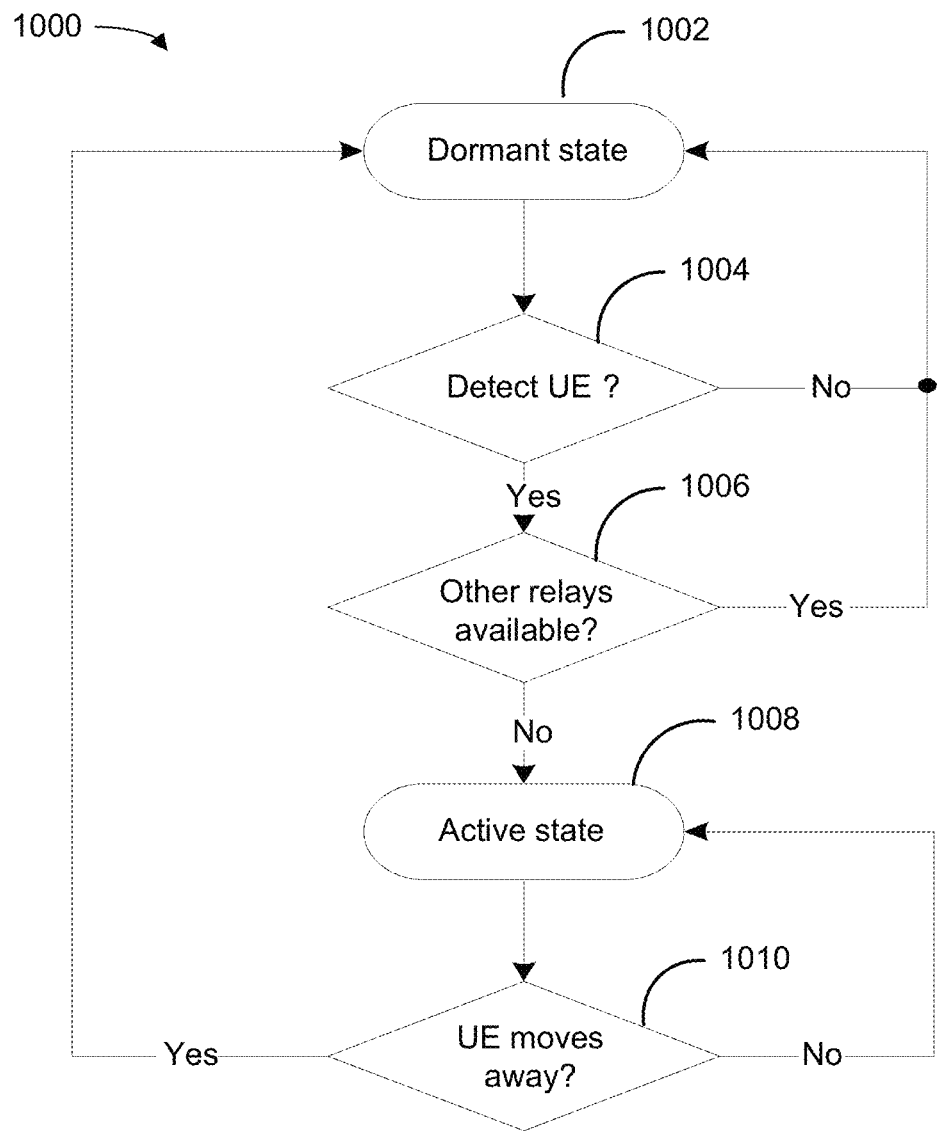
FIG. 10 is a flow chart illustrating low power node state transitions on an access link according to an aspect of the present disclosure.

FIG. 10 illustrates an exemplary flow chart 1000 for a low power node's transitions between active and dormant states on the access link according to an aspect of the present disclosure. At block 1002, the access link and backhaul link of the low power node may be in a dormant state. If the low power node detects a UE at block 1004, the low power node then determines if other low power nodes are available at block 1006 to serve the UE. In one configuration, the order of blocks 1004 and 1006 may be interchanged because a low power node may ignore a UE if another suitable low power node is available. If a UE is detected at block 1004 and another low power node is not available (1006:NO), the access link of the low power node transitions to the active state 1008. Once the access link is in the active state, the low power node may transition back to the dormant state if the last UE or triggering UE moves away at block 1010. Otherwise, the low power node remains in the active state. If no UEs are detected (1004:NO) or other low power nodes are available (1006:NO) the process returns to block 1002 where the access link and backhaul link of the low power node remain in the dormant state.

Figure 11:
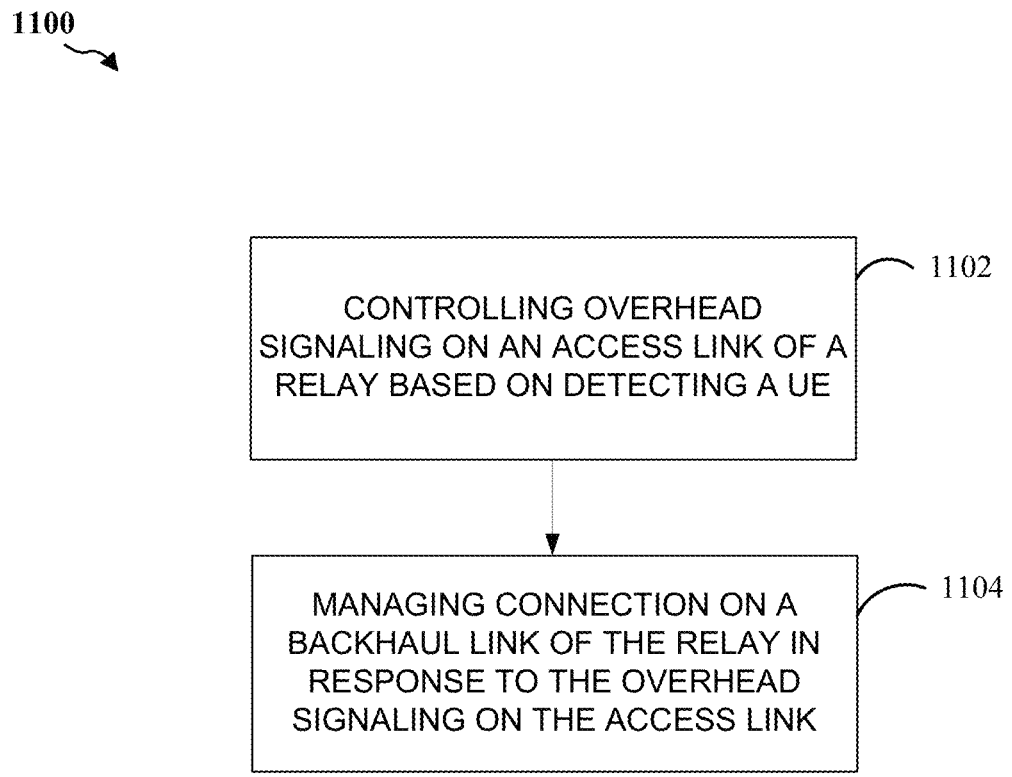
FIG. 11 is a block diagram illustrating a method for controlling low power node activity on an access link and a backhaul link according to an aspect of the present disclosure.

FIG. 11 illustrates a method 1100 for controlling low power node activity states. At block 1102, the low power node controls the overhead signaling on an access link of a low power node based on detecting a UE. Next, in block 1104, the connection on a backhaul link of the low power node is managed in response to the overhead signaling on the access link.

Figure 12:
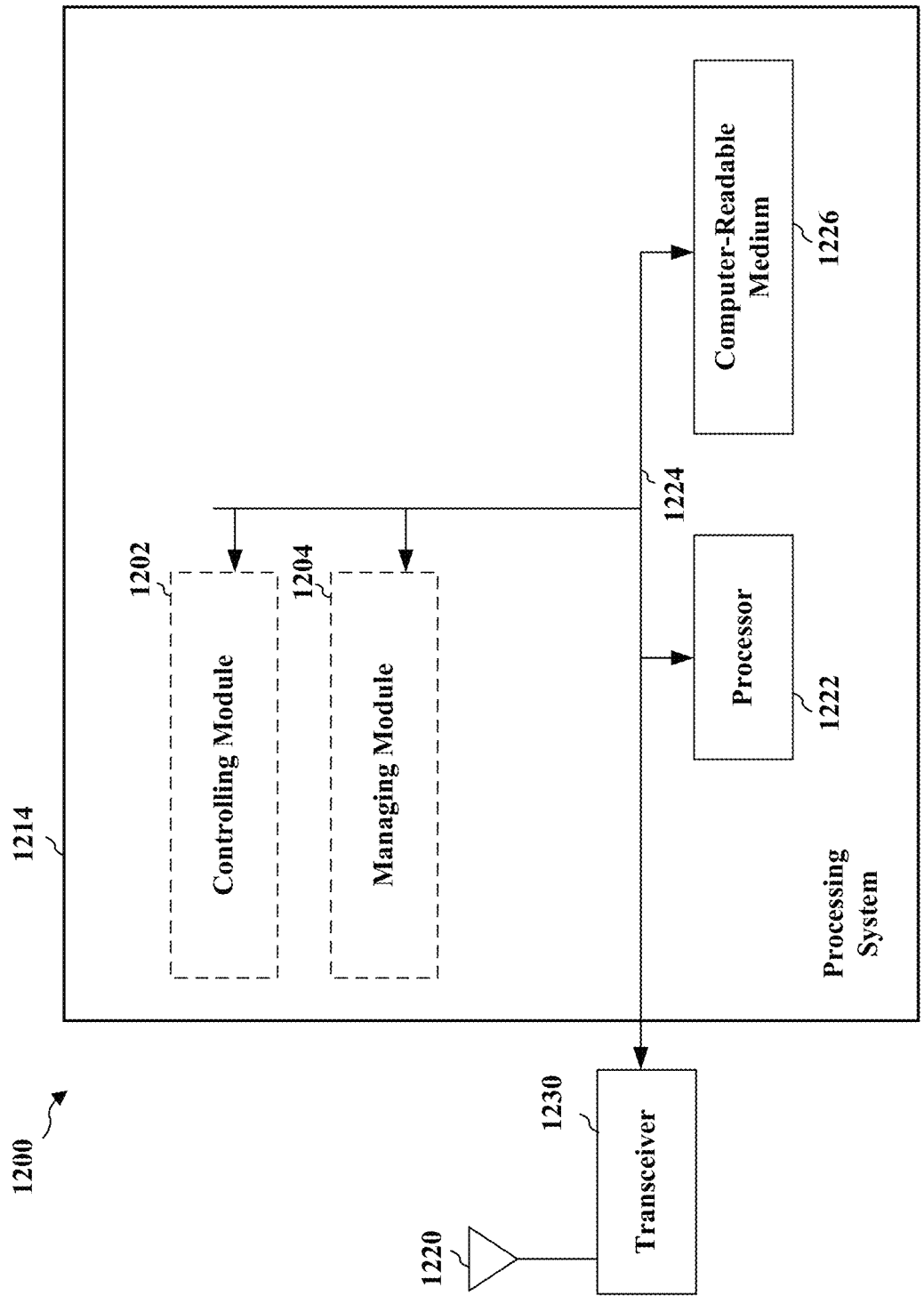
FIG. 12 is a block diagram illustrating different modules/means/components in an exemplary apparatus.

FIG. 12 is a diagram illustrating an example of a hardware implementation for a low power node 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1222 the modules 1202, 1204, and the computer-readable medium 1226. The bus 1224 may also link various other circuits such as timing sources, peripherals, voltage regulators, and power management circuits, which are well known in the art, and therefore, will not be described any further.

The apparatus includes a processing system 1214 coupled to a transceiver 1230. The transceiver 1230 is coupled to one or more antennas 1220. The transceiver 1230 enables communicating with various other apparatus over a transmission medium. The processing system 1214 includes a processor 1222 coupled to a computer-readable medium 1226. The processor 1222 is responsible for general processing, including the execution of software stored on the computer-readable medium 1226. The software, when executed by the processor 1222, causes the processing system 1214 to perform the various functions described for any particular apparatus. The computer-readable medium 1226 may also be used for storing data that is manipulated by the processor 1222 when executing software.

The processing system 1214 includes a controlling module 1202 for controlling overhead signaling on an access link of a low power node. The processing system 1214 also includes a managing module 1204 for managing a connection on a backhaul link of the low power node. The modules may be software modules running in the processor 1222, resident/stored in the computer-readable medium 1226, one or more hardware modules coupled to the processor 1222, or some combination thereof. The processing system 1214 may be a component of the low power node 730.

In one configuration, the low power node is configured for wireless communication including means for controlling overhead signaling on an access link of a low power node based on detecting a user equipment (UE). In one aspect, the means may be the module 1202. The low power node also includes means for managing a connection on a backhaul link of the low power node in response to the overhead signaling on the access link. In one aspect, the means may be the module 1204. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   detecting, at a first user equipment (UE) relay node, a UE;
   determining whether an active second UE relay node is present in response to detecting the UE;
   controlling, at the first UE relay node, a transition of an access link from a dormant state to an active state when the UE is detected and when the active second UE relay node is not present; and
   managing, at the first UE relay note in response to the transition, a connection on a backhaul link to enter a dormant state for the backhaul link by at least decreasing a duty cycle of network timing and frequency tracking, decreasing a duty cycle of low power node access opportunity to a base station, or a combination thereof, and the connection on the backhaul link transitioning to an active state, based on a triggering event, by accessing the base station and establishing signaling and data radio bearers.

2. The method of claim 1, in which the connection on the backhaul link is managed in response to a requested access to the backhaul link.

3. The method of claim 1, in which the access link remains in the dormant state when the active second UE relay node is present.

4. The method of claim 1, in which the dormant state comprises at least a decreased duty cycle of UE relay node advertisement, a decreased duty cycle of UE access opportunity, or a combination thereof.

5. The method of claim 4, in which the active state comprises at least an increased duty cycle for UE relay node advertisement, an increased duty cycle for UE access opportunity, or a combination thereof.

6. The method of claim 1, in which the detecting the UE comprises receiving at least a random access channel (RACH) message, a sounding reference signal (SRS), a signature sequence, or a combination thereof.

7. A first user equipment (UE) relay node for wireless communication, comprising:
a memory; and
at least one processor coupled to the memory, the at least one processor being configured:
to detect a UE;
to determine whether an active second UE relay node is present in response to detecting the UE;
to control a transition of an access link from a dormant state to an active state of a low power node based on detecting a user equipment when the UE is detected and when the active second relay node is not present; and
to manage, in response to the transition, a connection on a backhaul link to enter a dormant state for the backhaul link by at least decreasing a duty cycle of network timing and frequency tracking, decreasing a duty cycle of low power node access opportunity to a base station, or a combination thereof, and the connection on the backhaul link transitioning to an active state, based on a triggering event, by accessing the base station and establishing signaling and data radio bearers.

8. The first relay UE of claim 7, in which the connection on the backhaul link is managed in response to a requested access to the backhaul link.

9. The first relay UE of claim 7, in which the access link remains in the dormant state when the active second UE relay node is present.

10. The first relay UE of claim 7, in which the dormant state comprises at least a decreased duty cycle of UE relay node advertisement a decreased duty cycle of UE access opportunity, or a combination thereof.

11. The first relay UE of claim 10, in which the active state comprises at least an increased duty cycle for UE relay node advertisement, an increased duty cycle for UE access opportunity, or a combination thereof.

12. The first relay UE of claim 7, in which the at least one processor is further configured to receive at least a random access channel (RACH) message, a sounding reference signal (SRS), a signature sequence, or a combination thereof.

13. A computer program product for wireless communication in a wireless network, comprising:
a non-transitory computer-readable medium having non-transitory program code recorded thereon, the program code comprising:
program code to detect, at a first user equipment (UE) relay node, a UE;
program code to determine whether an active second UE relay node is present in response to detecting the UE;
program code to control, at the first UE relay node, a transition of an access link from a dormant state to an active state of a low power node based on detecting a user equipment when the UE is detected and when the active second relay node is not present; and
program code to manage, at the first UE relay node in response to the transition, a connection on a backhaul link to enter a dormant state for the backhaul link by at least decreasing a duty cycle of network timing and frequency tracking, decreasing a duty cycle of low power node access opportunity to a base station, or a combination thereof, and the connection on the backhaul link transitioning to an active state, based on a triggering event, by accessing the base station and establishing signaling and data radio bearers.

14. The computer program product of claim 13, in which the connection on the backhaul link is managed in response to a requested access to the backhaul link.

15. The computer program product of claim 13, in which the access link remains in the dormant state when the active second UE relay node.

* * * * *